No. 866,796.
PATENTED SEPT. 24, 1907.
F. N. MARTINDALE.
STRAINER FOR TEAPOTS.
APPLICATION FILED FEB. 6, 1907.
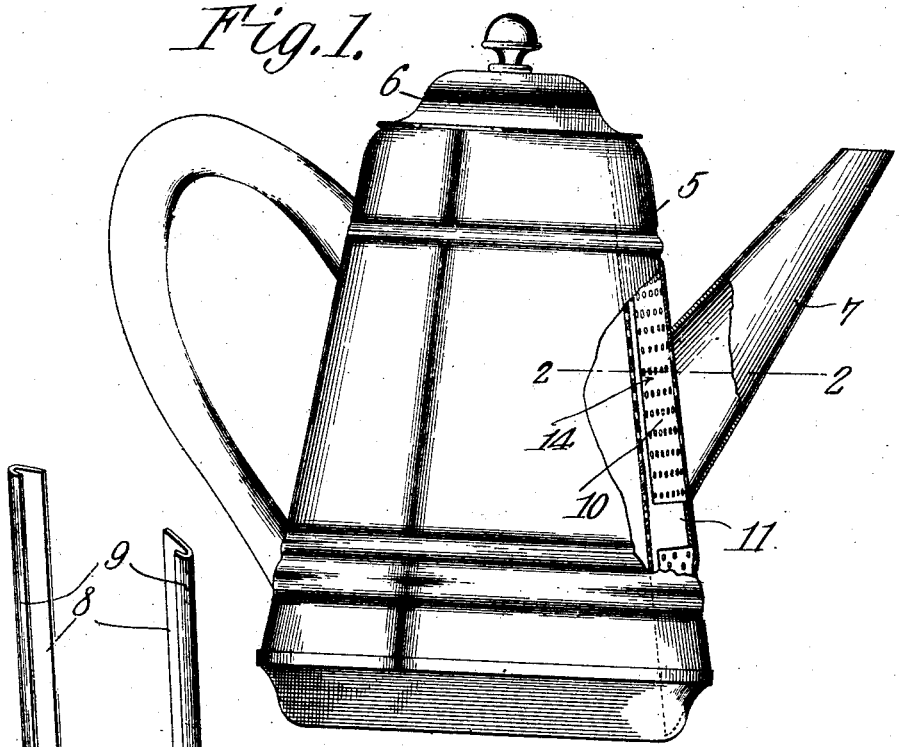
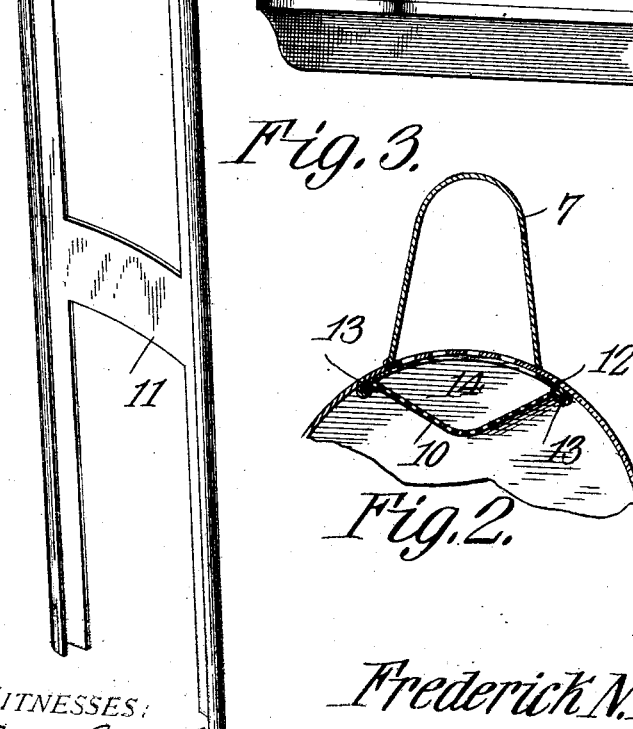
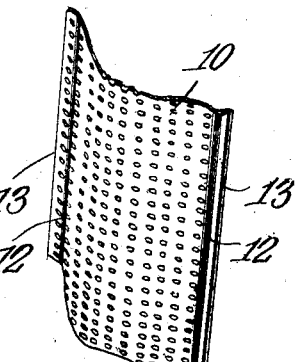
WITNESSES:
Frederick N. Martindale,
INVENTOR
By C. A. Snow & Co.
ATTORNEYS

UNITED STATES PATENT OFFICE.

FREDERICK NEWELL MARTINDALE, OF GOUVERNEUR, NEW YORK.

STRAINER FOR TEAPOTS.

No. 866,796.  Specification of Letters Patent.  Patented Sept. 24, 1907.

Application filed February 6, 1907. Serial No. 356,062.

*To all whom it may concern:*

Be it known that I, FREDERICK NEWELL MARTINDALE, a citizen of the United States, residing at Gouverneur, in the county of St. Lawrence and State of New York, have invented a new and useful Strainer for Teapots, of which the following is a specification.

This invention relates to strainers for tea-pots and similar containing vessels and has for its object to provide a comparatively simple and inexpensive device of this character capable of being readily attached to or removed from the vessel and which forms a closure for the spout of the latter so as to effectually prevent the same from becoming clogged or otherwise obstructed.

A further object of the invention is to provide a strainer supporting frame adapted to be soldered or otherwise rigidly secured to the interior walls of the vessel and consisting of guiding flanges spaced apart and maintained in parallelism by a connecting web so as to permit the strainer to be readily positioned within or removed from the vessel without danger of binding or wedging between said flanges.

A still further object of the invention is to generally improve this class of devices so as to increase their utility, durability and efficiency as well as to reduce the cost of manufacture.

Further objects and advantages will appear in the following description, it being understood that various changes in form, proportions and minor details of construction may be resorted to within the scope of the appended claims.

In the accompanying drawings forming a part of this specification: Figure 1 is a side elevation partly in section of a tea-pot provided with a strainer constructed in accordance with my invention. Fig. 2 is a transverse sectional view taken on the line 2—2 of Fig. 1. Fig. 3 is a perspective view of the strainer supporting frame detached. Fig. 4 is a similar view of a portion of the strainer removed.

Similar numerals of reference indicate corresponding parts in all of the figures of the drawings.

The improved device is principally designed for use in connection with tea-pots, coffee pots and similar containing vessels and by way of illustration is shown in connection with a tea-pot of the ordinary construction in which 5 designates the body of the vessel, 6 the pivoted cover and 7 the discharge spout.

The attachment consists of a strainer supporting frame preferably stamped or otherwise formed from a single piece of metal and comprising spaced longitudinal strips 8 having their outer edges bent inwardly to form guides or flanges 9 for the reception of the removable strainer 10. The strips 8 are maintained in parallel relation with each other by an integral transverse connecting web 11, said longitudinal and transverse strips being preferably curved or bowed to conform to the interior walls of the containing vessel, as shown. By having the longitudinal strips spaced apart by the integral connecting web 11, the longitudinal strips are maintained in parallel relation so that the strainer supporting frame may be conveniently positioned within the containing vessel at the discharge spout thereof without special attention on the part of the work-man and without danger of the strainer binding or otherwise wedging between the guide flanges.

The strainer 10 is preferably formed of a single piece of wire-fabric, perforated metal or other suitable material, the opposite longitudinal edges of which are bent laterally at 12 to produce longitudinal flanges 13 adapted to enter the guides 9 of the strips 8 thereby to lock the strainer against accidental displacement. The strainer 10 may be of any desired length and cross sectional formation and is preferably of a length equal to the length of the strainer supporting frame with its intermediate portion bowed outwardly so as to form a chamber 14 between the intermediate portion of the strainer and the adjacent interior walls of the containing vessel.

It will here be noted that the guide flanges 9 are rigidly supported in parallel relation so as to render it unnecessary for the work-man in placing the frame within the vessel to see that said flanges are spaced apart the proper distance and consequently insuring free sliding movement of the strainer between said flanges. It will also be noted that the intermediate bowed portion of the strainer causes the opposite longitudinal edges of the flanges 13 of said strainer to yieldably engage the walls of the guide flanges 9 and thus assist in supporting the strainer within the tea-pot.

The supporting frame and strainer may be used in connection with tea or coffee pots formed of metal, porcelain, terra-cotta or other suitable material and may be applied to the vessel either during the manufacture of the same or subsequently, as desired.

From the foregoing description it will be seen that there is provided an extremely simple, inexpensive and efficient device admirably adapted for the attainment of the ends in view.

Having thus described the invention what is claimed is:

1. The combination with a containing vessel having a discharge spout, of a strainer supporting frame rigidly secured to the interior walls of the vessel at said discharge spout and including spaced parallel guides having their upper and lower ends separated and their intermediate portions connected by a transverse web, and of approximately the same width as the guides, and a strainer engaging the guides and forming a closure for the spout.

2. The combination with a containing vessel having a discharge spout, of a supporting frame independent of the spout and rigidly secured to the interior walls of the vessel and including spaced longitudinal strips having their opposite ends separated and their intermediate portions connected by a relatively narrow web, said longitudinal strips being bent to form parallel guides, and a strainer slidably mounted within the guides and forming a closure for the discharge spout.

3. The combination with a containing vessel having a discharge spout, of a strainer supporting frame curved to conform to the interior walls of the containing vessel and consisting of spaced parallel guides having their opposite ends separated and their intermediate portions connected by a relatively narrow web, said guides and web being curved to conform to the interior walls of the vessel, and a strainer slidably mounted between the guides and forming a closure for the discharge spout.

4. The combination with a containing vessel having a discharge spout, of a strainer supporting frame independent of the spout and secured to the interior walls of the containing vessel and curved to conform to said walls, said frame being formed of longitudinal strips having their opposite ends separated and their inner longitudinal edges connected by a relatively narrow web formed integral with said strips, the outer longitudinal edges of the strips being bent inwardly to form parallel guides, and a removable strainer having its intermediate portion spaced from the interior walls of the containing vessel and its opposite longitudinal edges bent to form terminal flanges adapted to slidably engage the guides of the supporting frame.

5. A strainer including a supporting frame formed of a single piece of metal and consisting of spaced parallel guides having their opposite ends separated and their intermediate portions united by a relatively narrow connecting web disposed flush with the guides, and a strainer slidably mounted between the guides.

6. A strainer including a supporting frame stamped from a single piece of metal and consisting of spaced longitudinal strips having their opposite ends separated and their intermediate portions united by a relatively narrow connecting web, the outer longitudinal edges of the strips being bent to form inwardly extending guides, said strips and connecting web being curved transversely, and a strainer having oppositely disposed flanges adapted to engage the guides of the supporting frame.

In testimony that I claim the foregoing as my own, I have hereto affixed my signature in the presence of two witnesses.

FREDERICK NEWELL MARTINDALE.

Witnesses:
C. S. BODMAN, Jr.,
F. G. BRIGGS.